United States Patent [19]

Demaison et al.

[11] Patent Number: 4,659,675
[45] Date of Patent: * Apr. 21, 1987

[54] PREDICTING HYDROCARBON POTENTIAL OF AN EARTH FORMATION UNDERLYING A BODY OF WATER BY ANALYSIS OF SEEPS CONTAINING LOW CONCENTRATIONS OF METHANE USING IMPROVED CRYOGENIC ENTRAPMENT

[75] Inventors: Gerard J. Demaison, Orinda; Isaac R. Kaplan, Sherman Oaks, both of Calif.

[73] Assignee: Chevron Research Company, San Francisco, Calif.

[ * ] Notice: The portion of the term of this patent subsequent to Jul. 20, 1999 has been disclaimed.

[21] Appl. No.: 616,505

[22] Filed: May 31, 1984

Related U.S. Application Data

[63] Continuation of Ser. No. 363,351, Mar. 29, 1982, abandoned, which is a continuation-in-part of Ser. No. 282,841, Jul. 13, 1981, Pat. No. 4,340,391.

[51] Int. Cl.⁴ ............................................. G01N 33/24
[52] U.S. Cl. ...................... 436/29; 436/141; 436/158; 436/175; 436/178
[58] Field of Search .......... 23/230 R, 230 EP, 232 R; 73/19, 23.1, 61 R, 23; 55/55; 422/80, 61, 94; 436/29, 141, 144, 158, 177, 133, 59, 178, 175, 161

[56] References Cited

U.S. PATENT DOCUMENTS

| | | | |
|---|---|---|---|
| 2,389,706 | 11/1945 | Williams et al. | 422/94 |
| 2,427,261 | 9/1947 | Crawford | 436/141 X |
| 3,050,372 | 8/1962 | Scott | 436/158 X |
| 3,226,197 | 12/1965 | Lewis | 436/59 |
| 3,455,144 | 7/1969 | Bradley | 73/19 |
| 3,945,797 | 3/1976 | Mlinko et al. | 436/59 |
| 4,340,391 | 7/1982 | Demaison et al. | 436/29 |
| 4,444,889 | 4/1984 | Demaison et al. | 436/29 |

*Primary Examiner*—Kenneth M. Schor
*Attorney, Agent, or Firm*—S. R. LaPaglia; E. J. Keeling; H. D. Messner

[57] ABSTRACT

The present invention provides for on-site capture of methane at sea at dry ice temperature, for isotopic examination. In more detail, after interfering gas species have been removed from subsequent operational steps, the methane is oxidized to carbon dioxide and water vapor, which are then trapped with a trapping tube maintained at dry ice temperature. The tube also houses a bed of granules made of porous polymer cross-linked to form a lattice network for retention of the carbon dioxide without a change in phase. Thereafter, the carbon and deuterium distribution of the oxidized methane products, carbon dioxide and water vapor, are determined by isotopic examination so as to establish their biogenic and/or thermogenic origin.

5 Claims, 7 Drawing Figures

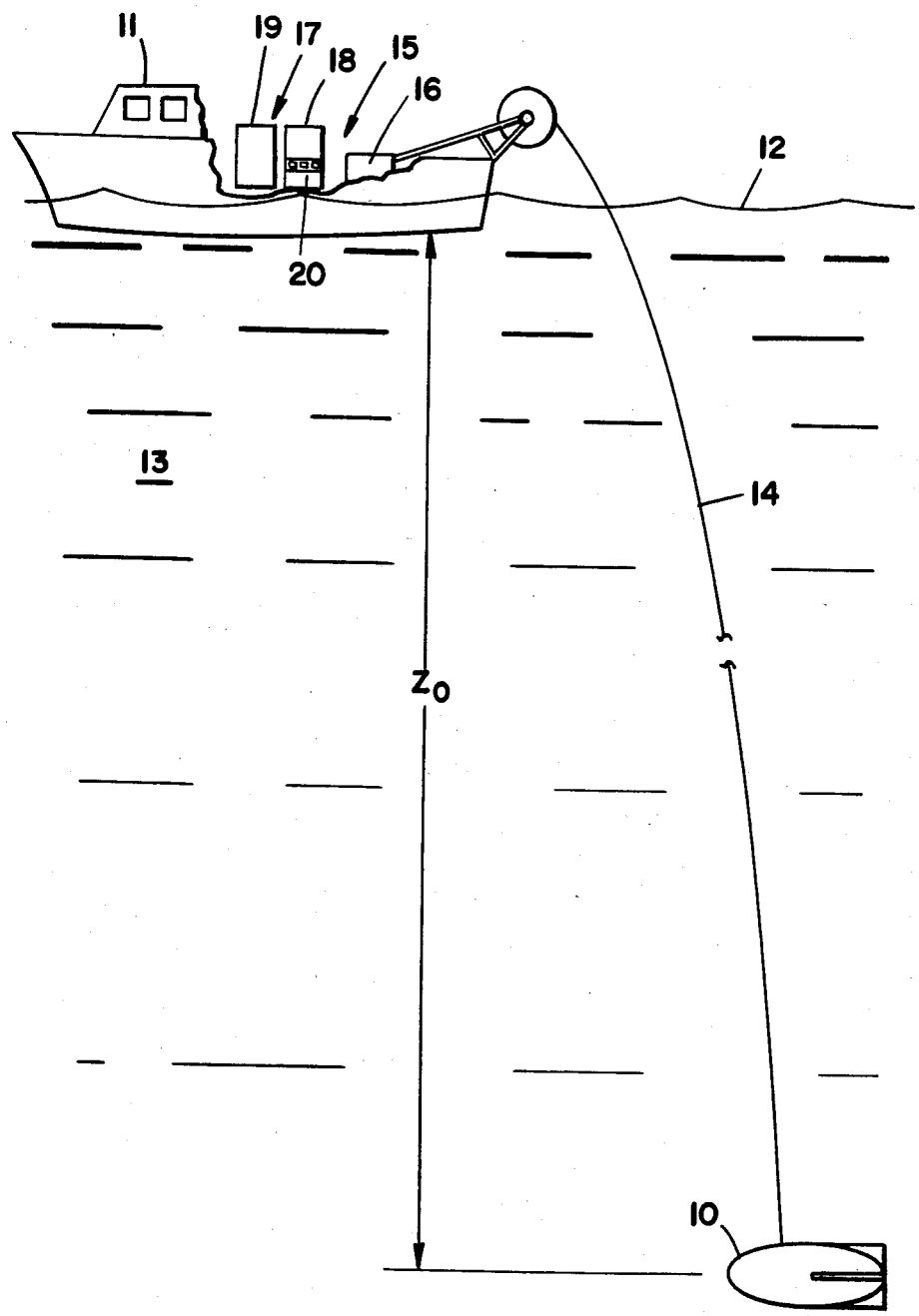
FIG_1

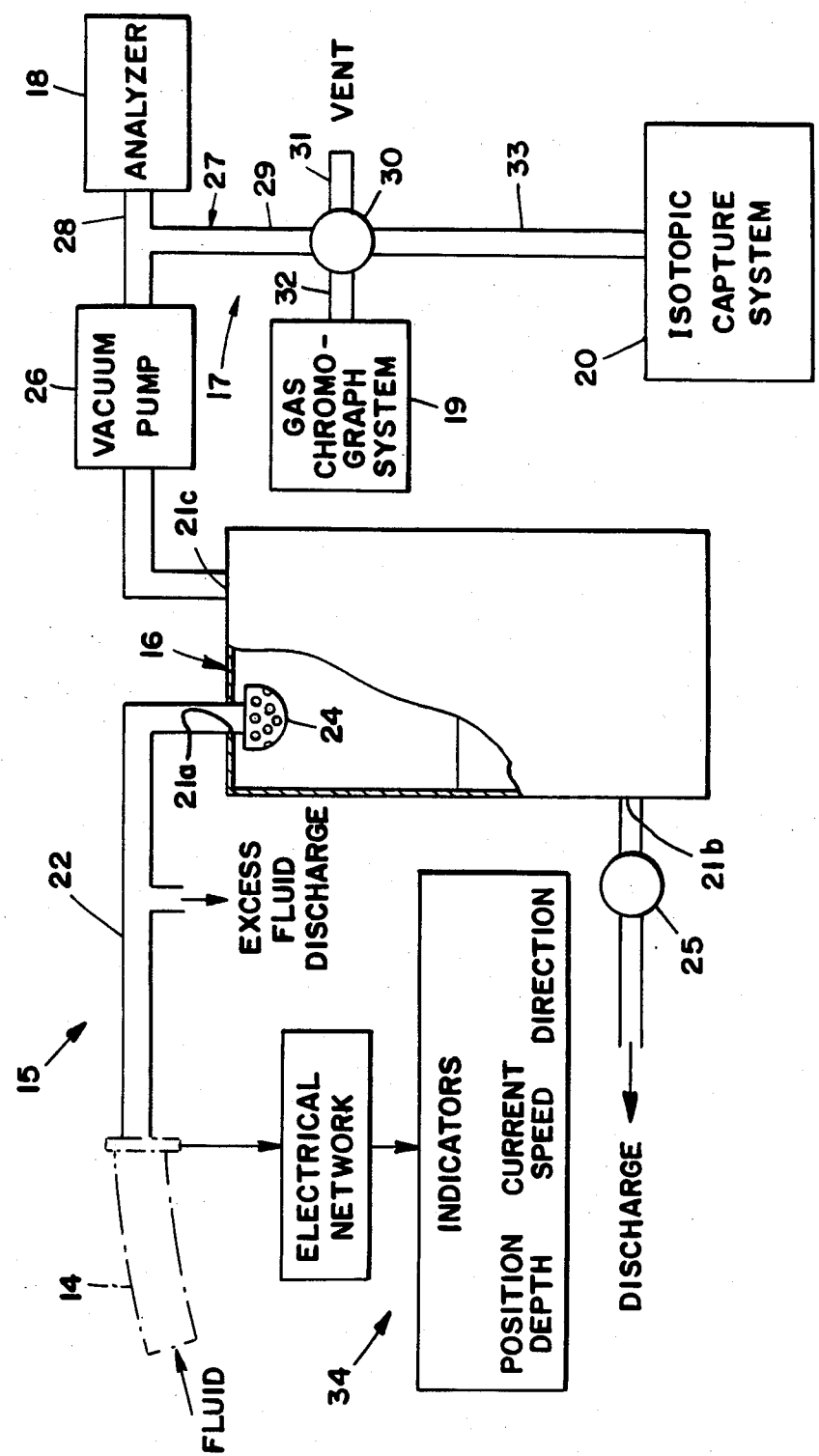
FIG_2

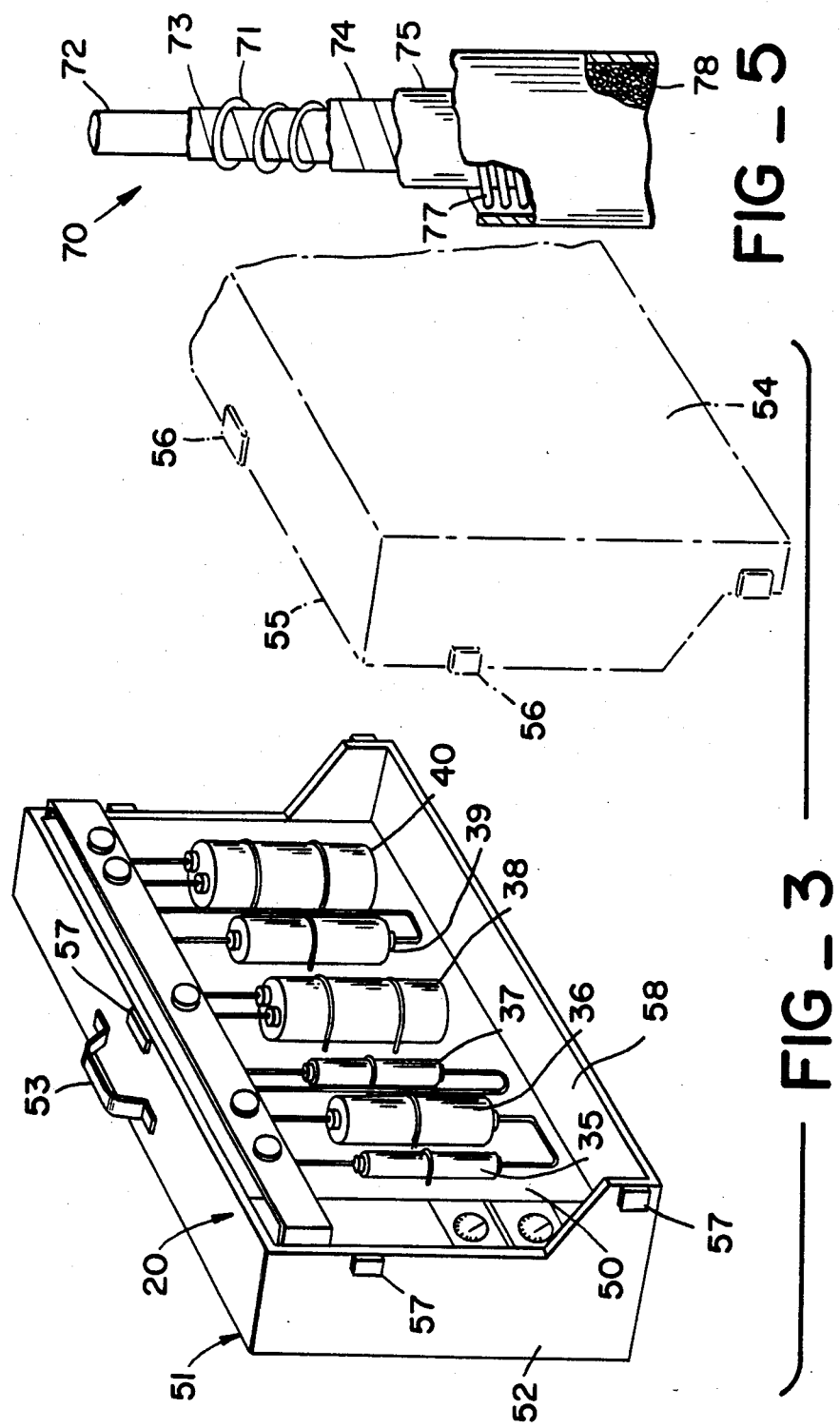

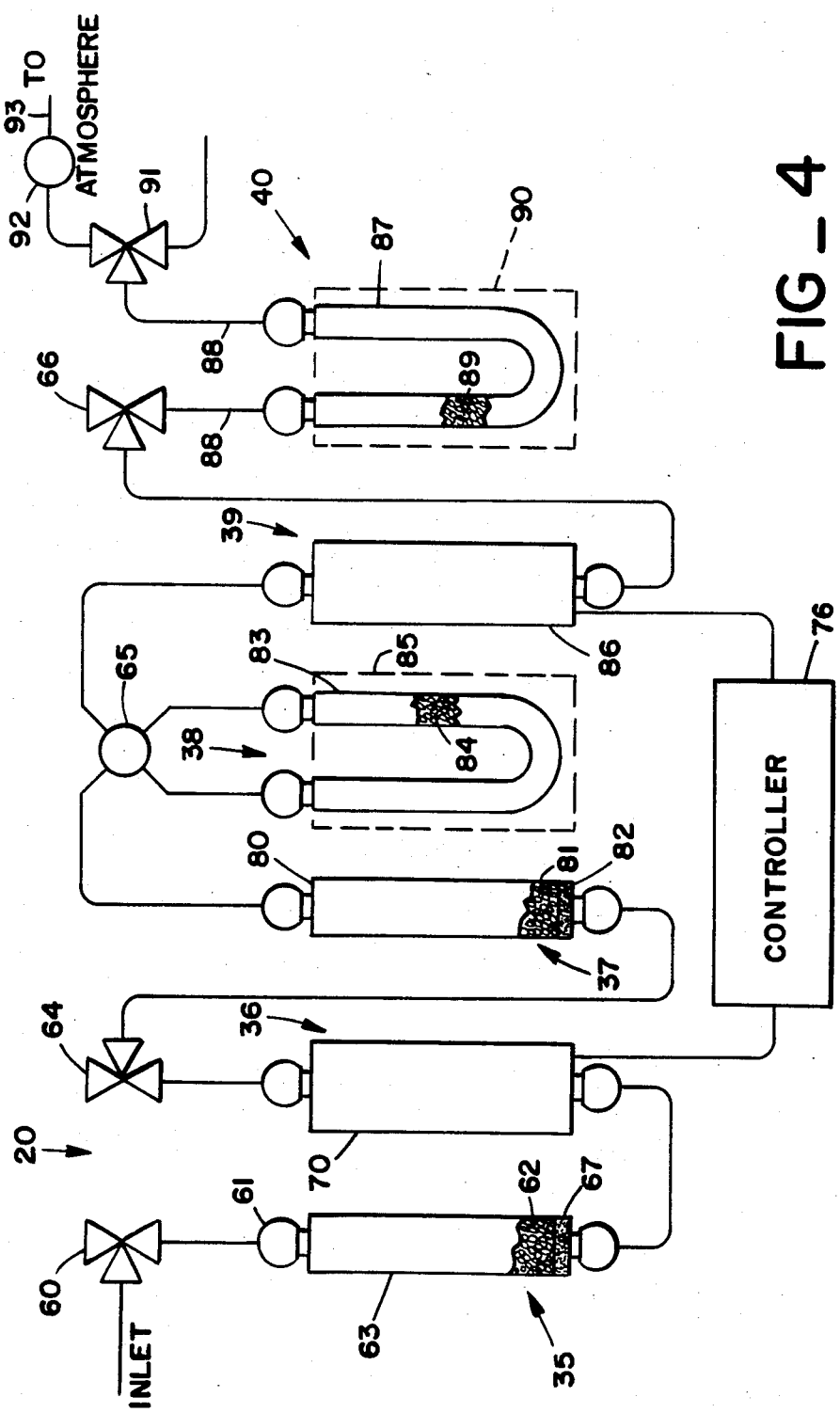
FIG_4

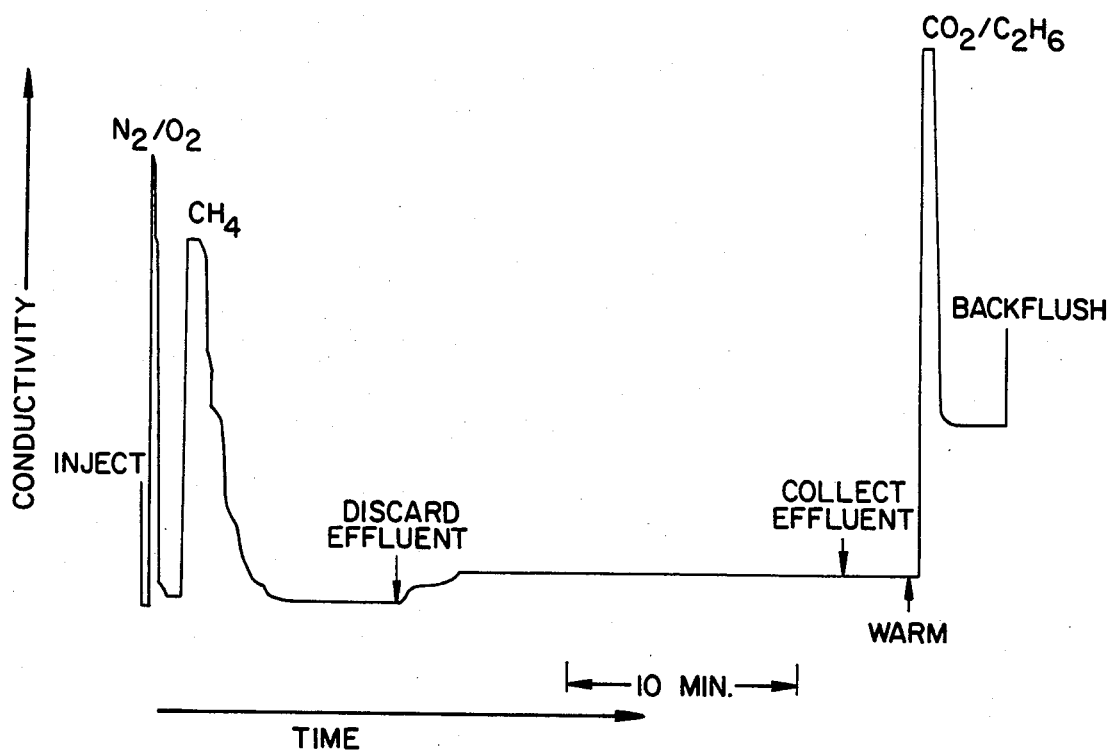
FIG_6
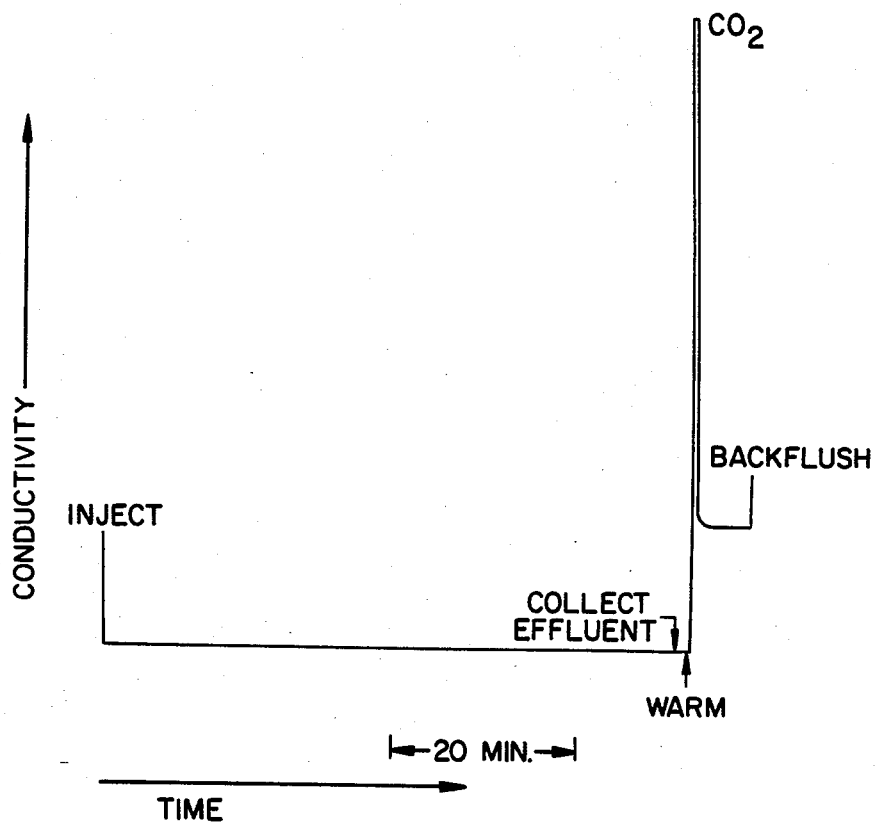
FIG_7

– 1 –

PREDICTING HYDROCARBON POTENTIAL OF AN EARTH FORMATION UNDERLYING A BODY OF WATER BY ANALYSIS OF SEEPS CONTAINING LOW CONCENTRATIONS OF METHANE USING IMPROVED CRYOGENIC ENTRAPMENT

CROSS-REFERENCES TO RELATED APPLICATIONS

This application is a continuation of Ser. No. 363,351, filed Mar. 29, 1982, now abandoned, which is a continuation-in-part of Ser. No. 282,841, filed July 13, 1981, now U.S. Pat. No. 4,340,391.

SCOPE OF THE INVENTION

This invention relates to a method and apparatus—in general—for providing for isotopic chemical analysis of methane seeping from a hydrocarbon pool or other source of organic matter associated with an earth formation underlying a body of water, and—in particular—for providing for on-site capture of such gas whereby indications of their biogenic and/or thermogenic origin of the pool can be accurately forecasted.

In one aspect, the present invention provides for the acquisition of highly accurate data related to the isotopic chemistry of extremely small concentrations of such gas, say 1 to 10 microliters per liter of the sea water, being constantly collected at depth.

In another aspect, the dissolved methane can be collected in sufficient amounts utilizing vacuum separation and selective capture techniques in the presence of an inert air carrier. The sequence of steps includes: carbonaceous fluids are first separated from the water collected at depth; then the methane present is quantitatively converted to gaseous carbon dioxide and heavy water. Basis of later analysis is the isotopic composition of the $^{13}C$ (or $^{14}C$) and deuterium associated with the collected sample. Further, since the normalized variation of $^{12}C$ to $^{13}C$ (i.e., the delta $^{13}C$ measurement) requires less amounts of methane to be collected, such analytical method is preferred. The delta $^{13}C$ measurement is defined in *Petroleum Formation and Occurrence*, B. P. Tissot, D. H. Welte, Springer-Verlag, N.Y., (1978) at p. 88 as:

$$^{13}C^\circ/_{oo} = \frac{(^{13}C/^{12}C) \text{ sample} - (^{13}C/^{12}C) \text{ standard}}{(^{13}C/^{12}C) \text{ standard}} \times 1000.$$

BACKGROUND OF THE INVENTION

While marine exploration systems are presently available for continuously sampling water seeps so as to analyze for presence of carbonaceous fluids such as methane, none have the capability of providing a compositional parameter that is uniquely diagnostic of seep origin, and hence allowing the user/operator to distinguish the biogenically derived sample from a sample associated with a hydrocarbon source.

Reasons: Other interpretative tests were thought to be sufficient from a cost/result standpoint. Also, the lengthy and complexed nature of the steps involved in collecting, isolating and tagging sufficient amounts of the samples for such analysis were thought to be beyond the capability of present on-site collection and analytical systems.

MODIFICATIONS IN ACCORDANCE WITH THE PRESENT INVENTION

When it was noted in the above-identified applications that hydrocarbon potential of earth formations (underlying bodies of water) could be evaluated based, inter alia, on $^{13}C$ (or $^{14}C$ and/or delta $^{13}C$) as well as deuterium content of collected methane samples, interest in shipboard collection and analysis techniques has now intensified.

It has been discovered that the low temperature environment required for the trapping of such constituents (as well as for removing some interfering gas species of the sample) can be surprisingly provided without phase change using annular beds of high surface area, porous, cross-linked, polymeric granules held in place within cooled glass U-tubes. Size of the granules: of the order of 100–120 mesh. Operating temperature of each bed: about $-70°$ C., provided by powdered dry ice surrounding the U-tubes.

Since dry ice is readily available throughout the world, mapping of the hydrocarbon potential of less accessible areas of the earth, say those associated with bodies of water, of less industrialized countries, is enhanced.

SUMMARY OF THE INVENTION

In accordance with the present invention, a quick, convenient and highly accurate technique for the acquisition of sufficient amounts of methane dissolved in sea water is provided. Result: Indications of their isotopic character—and biogenically and/or thermogenically derived origin of the associated pool—can be easily and suprisingly accurately determined, irrespective of geographic location.

In more detail, sea water is first collected via an electro-hydraulic cable, at depth by a drone trailing from a sea-going vessel, the water being pumped at a substantially constant flow rate in a range from about 3 to 7 liters/minute. Up-cable destination of the water: A vacuum chamber aboard the vessel where the water is broken into droplets under a slight vacuum (27–28 inches of mercury) and the gaseous constituents, liberated. These constituents are carried via an air stream to a continuous hydrocarbon flame monitor where, if the flame monitor response is positive, more complexed analytical equipment is brought into play; e.g., a multiport valve can be energized as to allow the dissolved gases to be analyzed chromatographically. Or still another of the valve ports can be activated to allow the same constituents to flow into and through an isotopic trapping network where collection in microliter amounts occurs. Within the isotopic network, use is made of the flowing air stream (flow rate being preferably about 30 milliliters per minute in a range of 20–120 milliliters per minute). Gases of interest pass, in seriate, from station-to-station: Methane is isolated (by removing all interfering species using cryogenically aided entrapment at dry ice temperature), and finally converted to gaseous carbon dioxide and heavy water, if present (in a catalytically aided complete oxidation reaction), and both are trapped in a U-shaped trapping chamber, again at dry ice temperature. Next, the ends of the trapping chamber are heated and collapsed, sealing them from the atmosphere.

The dry ice temperature ($-70°$ C.) is provided by solid dry ice in powdered form (i.e., granulated). Moreover, such trapping medium has been found to be surprisingly efficient even though air may be present at the boundary of the glass tubing and ice and the irregular shape of the powdered dry ice at the boundary provides less than 100% surface-to-surface contact. Hence, mapping of the hydrocarbon potential of less accessible areas of the earth (where liquid cryogenic agents are not available) is surprisingly enhanced by the present invention.

After being transported to a mass spectrometer, the chamber is re-opened so that isotopic analysis can occur. Using the latter results (along with geographic address data) allows for accurate biogenically and thermogenically associated predictions to be made.

DESCRIPTION OF THE DRAWINGS

FIG. 1 illustrates operation of the present invention, utilizing a vessel positioned on a body of water overlying an earth formation that collects and analyzes, continuously, samples of water at depth;

FIG. 2 is a schematic diagram of collection and analytical operations attendent on-site collection of water samples by the vessel of FIG. 1;

FIGS. 3-5 are detailed drawings of an isotopic capture network of the associated on-site collection and analytical operations of FIG. 2; and FIGS. 6-7 are chromatograms illustrating further aspects of the present invention.

DETAILED DESCRIPTION OF THE PRESENT INVENTION

FIG. 1 illustrates the present invention.

As shown, a drone 10 is positioned at a depth $Z_0$ below a vessel 11 floating at the surface 12 of the body of water 13. Within the drone 10, is a pump (not shown). The purpose of the pump: To draw water samples interior of the drone 10 and pump them up-cable (via electrohydraulic cable 14) to a diagnostic system 15 aboard the vessel 11.

In addition to pumping equipment, the drone 10 is fitted with various oceanagraphic devices, including a depth sensor; a current monitor is also provided that includes a bottom-oriented sonar device in combination with an electromagnetic sensor for measuring the speed and direction of the ocean currents relative to the bottom. Signals from these devices pass via conductors in the side walls of the cable 14 so as to provide annotation (both visual and on tape), associated with geographic position (of the drone and/or the vessel), depth of the drone, etc., as shown. In that way, accurate geographic addresses for the samples as a function of drone and/or vessel location, is assured.

Diagnostic system 15 also provides for a series of geochemical tests, and includes vacuum separation system 16 and a gas phase analysis network 17. Key to diagnostic results using network 17: determination that hydrocarbon gases are present and what types (using hydrocarbon analyzer system 18) in combination with a gas chromatagraph 19, and then isotopic examination via isotopic capture network 20.

FIG. 2 illustrates operation of diagnostic system 15 in still more detail.

As shown, vacuum separation system 16 includes an air-tight chamber 21 for separating the water into liquid and gas phases. Entry and egress from the chamber 21 via a series of inlets and outlets 21A-21C. Inlet 21A receives the water samples via cable 14 and associated manifold 22. A nozzle 24 breaks water into droplets. Note that even though the flow rate of the water can be as high as 7 liters per minute, usual flow rate is usually about 3.7 liters per minute. The separated liquid phase is discharged from the chamber 21 via outlet 21B and pump 25. The gas phase exits via outlet 21C through vacuum pump 26 and exhaust manifold 27 in the presence of a wet air carrier.

Also of importance in the operation of diagnostic system 15: storage and display of all annotation data via the electrical network/display 34 to allow for determination of geographic addresses of all samples taken by the drone, as previously explained.

Manifold 27 includes an arm 28 which terminates in a continuously operating hydrogen flame ionization analyzer 18. Remaining arm 29 of the manifold 27 terminates at multi-port valve 30.

One port 31 of the valve 30 is open to the atmosphere. Another port 32 is disconnectably connected to gas chromatagraph 19 which, when operating, provides gas chromatograms. Yet another port 33 of the valve 30 is disconnectably connected to isotopic capture system 20 of the present invention.

Since the gas chromatograph 19 as used in association with operations of the present invention is usual, that is, the gas chromatograph 19 provides chromatograms of hydrocarbon components in the water, emphasis of description is placed on isotopic analysis system 20 of the present invention.

FIG. 3 illustrates how easily isotopic capture system 20 can be transported aboard a vessel 11 in either an assembled or unassembled state and be effectively operated in any type of environment. And since all functions associated with the isotopic capture system 20 occur aboard a sea-going vessel often in a hostile environment, constructional aspects related to portability, reliability and ruggedness are of some importance.

As shown, the capture system 20 includes a series of trapping and stripping stations 35-40 mounted to upright front panel 50 of carry-on capture box 51. The box 51 includes side, top and back panels 52, which form an enclosure interior thereof, wherein equipment associated with operations can be stowed either temporarily as during transport or permanently (as required). Carry handle 53 facilitates hand-transport of the box 51 to and from the vessel. Note also that the front panel 50 intersects bottom panel 58 near its center. Hence, not only can the operator use bottom panel 58 as a floor for equipment associated with stations 35-40, but also he can place a separate cover 54 (shown in phantom line) in attachment with the panels 52, 58 as when transport of the box is required. In that way, the equipment comprising the stations 35-40 can be protected against breakage during transport. Note that the cover 54 has extending side and top panels 55 of reverse orientation with respect to the shape provided the side, top and bottom panels. Result: Disconnectably connecting hinges 56 can be aligned with mounts 57 to releaseably attach the cover 54 with respect to the panels 50, 52 and 58.

FIG. 4 illustrates operation of stages 35-40 of system 20 in more detail.

Assume the operator has allowed dissolved gases to enter the system 20 via valve 60 to station 35 to begin operations.

The key to isotopic operation of system 20 lies in quantitative oxidation of the dissolved "signature" gas of interest, i.e., methane, as within oxidation station 39 and subsequent collection at station 40, of selected oxidants thereof. These operations occur after sinusoidal travel of all the collected, dissolved gases via the intermediate stations 35-38 as set forth below. The usual flow rate of the gas sample within system 20 is about 30 microliters per minute. The amount of collection at station 40 is dependent on the methane concentration in the sample sea water, the flow rate of the air carrier system, and the separation efficiency of the vacuum separation system aboard the vessel. If the normal methane concentration is 1 microliter per liter of water, and the extraction rate of the drone is 7 liters per minute at depth, then 10 minutes will be needed to collect about 50 microliters of the gas of interest at station 40, assuming extraction efficiency at the vacuum system of 75%. In the vicinity of modest gas seeps, the concentration of methane can easily approach 10 microliters per liter of water (STP) particularly in deep water. A background sample typically containing 0.2 microliters of methane will take 50 minutes to collect.

Briefly with reference to FIG. 4, the wet air carrier and the dissolved gases from the vacuum separation center enters station 35 at inlet 61. At the station 35, the gases percolate downwardly through the series of absorbent materials 62 supported in upright tube 63. Materials 62 remove both water vapor and molecular carbon dioxide. Next, the carbon monoxide which also occurs in variable abundance in water, is removed at station 36 by oxidation to carbon dioxide; the latter is subsequently removed from the carrier system after passing via valve 64 to station 37. The carrier gas stream containing both air gases and low molecular weight alkanes is then directed to stage 38 after passage through valve 65.

At the station 38, the lower, mid- and higher-range molecular weight hydrocarbons are removed, that is, all hydrocarbons above $C_1$. The remaining methane then enters station 39 where it is oxidized to gaseous carbon dioxide and water. After passage through valve 66 the latter is subsequently retained at station 40. The details of operation of stages 35-40 will now be presented in more detail below.

STATION 35

Purpose: To trap water vapor and molecular carbon dioxide in the gas phase of the separated sample. The station 35 is constructed of the tube 62 attached to the front panel 50 of capture box 51 upright position, see FIG. 3, the tube 63 usually being constructed of standard wall pyrex tubing. A bed of absorbent materials 62 is held in place by small wads of glass wool 67 placed at the ends of the tube 63. The absorbent materials 62 are conventional and are available in the industry for removing water vapor (viz., calcium chloride, $CaCl_2$) and for absorbing molecular carbon dioxide [namely, sodium hydroxide, Na(OH)]. Mixture ratio 1:1.

STATION 36

Purpose: To remove carbon monoxide which occurs in variable amounts in sea water using a flow-through furnace system 70.

As shown in detail FIG. 5, furnace 70 consists of a helix 71 wound about a quartz tube 72, the tube being previously wrapped with a single layer of asbestos tape 73. The helix 71 is then covered with additional asbestos tape 74 as well as with a glass wool matting 75 forming a sidewall into which a thermocouple (not shown) can be inserted. The ends of the helix 71 and the thermocouple are electrically connected to thermal controller 76 of FIG. 4. The controller 76 supplies regulated power to the furnace as a function of temperature. At the remaining annular space between the sidewalls of the wool matting 75 and the glass tube of the system 70 are positioned cupric oxide wire 77 along with platinized alumina pellets 78. The pellets 78 are placed at the downstream end of the tube 70, and held by quartz wool, not shown. The furnace operates about 125° C. whereby the carbon monoxide is oxidized to carbon dioxide.

STATION 37

Purpose: To remove carbon dioxide previously generated at station 36. Station 37 is constructed of a glass tube 80 filled with an absorbent material 81 such as sodium hydroxide, Na(OH), held in place with glass wads 82, and is similar in construction to station 35 previously described.

STATION 38

Purpose: To remove lower-, mid- and high-range molecular weight hydrocarbons. Station 38 is constructed of a metallic tube 83 filled with inert, porous, crosslinked, polymeric granules 84 forming a trapping bed 85. Size range: 100-120 mesh. Granules 84 are usually held in place by glass wool wads (not shown).

While properties of such granules 84 in conjunction with gas chromatography are well known (see, for example, "A Comparison of the Chromatographic Properties of Porous Polymers", S. B. Dave, *Journal of Chromatographic Science*, Vol. 7, July 1969, page 389 et. seq., and "Computerized Reduction and Analysis of Gas Chromatographic Data" P. C. Bentsen et al, *Journal of Chromatographic Science*, Vol. 7, July 1969, page 399 et. seq.); their shipboard use as a selective trapping material at dry ice temperature for isotopic purposes, is helieved to be novel. In this regard, granules manufactured by Waters Associates Inc., Framingham, Mass. 01701, under the tradename "Porapak 'N'" have been found to be adequate. These materials are essentially polyaromatic materials, such as styrenedivinylbenzene polymers, cross-linked to form an outwardly spaced lattice network. Result: such materials have rather high surface areas per unit weight, say about 450 meters$^2$ per gram, and provide adequate retention of the gases of interest while remaining insoluble relative to the associated fluids. Since adsorption, diffusion and partitioning all contribute to the effectiveness, it follows that micropore volume, pore size distribution of the granules 84, and the nature of the polymer are also important features for its use in accordance with the present invention.

When removal of low-, mid-, and high-range hydrocarbons is desired (removal of all hydrocarbons above $C_1$), powdered dry ice ($-70°$ C.) is placed circumferentially about the bed of polymeric granules 84. In this regard, the interaction of the dry ice trap 85 (including porous, polvmeric granules 84) with interfering gas species provides for a surprisingly efficient trapping operation even though carried out at the temperature of dry ice ($-70°$ C.).

Such dry ice temperature ($-70°$ C.) has been found to be surprisingly easy to maintain even though air may be present at the boundaries of the glass tubing and the irregular surfaces of the powdered dry ice forming the trap. Hence, mapping of the hydrocarbon potential of less accessible areas of the earth (where liquid cryogenic agents are not available) is enhanced.

If desired, station 38 can be by-passed via valve 65. Hence, clean-up of the tube 83 can be facilitated, i.e., a clean gas can be passed via valve 65 through the tube 83 while the bed of granules 84 is heated to a temperature of about 50°–100° C. for several minutes. Note that at temperatures above 150° C. however, the granules 84 will begin to decompose.

STATION 39

Purpose: To completely oxidize the methane of interest to gaseous carbon dioxide and water. The station 39 includes a furnace 86. It is similar in design and construction to the furnace 70 of station 36 shown in detail in FIG. 5, except that furnace 86 operates at temperatures in excess of 600° C. in a catalytically aided reaction. The temperature preferred is about 650° C. Result: Methane is quantitatively converted to carbon dioxide at a lower operating temperature than would be normal, due in part to the effect of the cupric oxide helix and platinized alumina beads used as catalysts within the furnace 86. In this regard, it should be noted the combustion efficiency of the furnace 86 at different ranges and temperatures has been tested. A standard hydrocarbon mixture consisting of say 66 parts per million methane, 10 parts per million $C_2H_6$, 10 parts per million $C_3H_6$, and 10 parts per million $C_4H_{10}$ in a helium carrier, was passed through furnace 86 at 30 milliliters per minute. The test was repeated at 20 milliliters per minute. The vent of the furnace 86 was connected to a gas chromatograph equipped with a flame ionization detector. At the maximum sensitivity of the detector (approximately 0.5 parts per million $CH_4$ equivalent) with the above mixture flowing through the furnace 86 at the above rates, no methane was detected at the detector. The condition continued as long as combustion furnace 86 was above 600° C., say preferably 650° C. Larger amounts of methane were syringe-injected (say up to 400 microliters of methane) into the furnace with similar results. Thus, it is concluded that furnace 86 will quantitatively oxidize all methane concentrations that are likely to be obtained in the field.

STATION 40

Purpose: To trap microliter quantities of carbon dioxide and heavy water, if any, oxidized at station 39.

Station 40 is constructed of a glass tube 87 bent into a U-shape. Its arms connect to transfer tubes 88 (and its inlet and outlet, respectively) which facilitate gas passage through the tube 87. The tube 87 forms a trapping bed and is again filled with inert, polymeric granules 89 similar to the type used at station 38. Size range: 100–120 mesh. Such granules held in place by wads of glass wool (not shown) are porous and are essentially cross-linked polyaromatic materials to provide the trapping function as in accordance with the present invention. Again, granules manufactured by Waters Associates Inc., Framingham, Massachusetts under the tradename "Porapak 'N'" have been found to be adequate for use in the above-identified environment.

Collection of the gaseous carbon dioxide and heavy water is affected by immersing the tube 87 (and the granules 89 of porous material) in a dewar or insulating container 90 filled with solid, powdered dry ice (−70° C.). Interaction of the porous, polymeric granules 89 with the microliter quantities of carbon dioxide (and heavy water, if any) provides for surprisingly efficient collection operation even though the latter is carried out at dry ice trapping temperature. Moreover, the temperature of the dry ice trap 90 (−70° C.) has been found to be surprisingly easy to maintain even though air may be present at the boundaries of the glass tubing and the irregular surfaces of the powdered dry ice forming the trap 90. Hence, mapping of the hydrocarbon potential of less accessible areas of the earth (where liquid cryogenic agents are not available) is again enhanced.

Note that at the outlet of the station 40, the transfer tube 88 connects via valve 91 to either (i) flow meter 92 and vent 93 or (ii) to a vacuum pump (not shown). During collection, item (i), above, is connected to the tube 87. After the collection is complete, the valve 91 is operated to connect the interior of the tube 87 to the vacuum pump and the latter is turned on. The transfer tubes 88 are then sealed by heating them with a small oxypropane torch. At a mass spectrometer site, the contents of the tube 87 (carbon dioxide and water vapor) and impurities, if they exist, (air gases, primarily) are introduced into a vacuum line where the carbon dioxide can be purified prior to isotopic analysis, if desired. Prior to reusing the tube 87 and beads 89, both are heated to 50°–100° C. in the stream of clean air to remove organic contaminants. Carbon dioxide has been found quantitatively to be retained on the porous granules 89 that form the trapping bed of interest, at the dry ice temperature (about −70° C.) for sixty (60) minutes at flow rates of about 150 milliliters per minute.

Thus, at air carrier flow rates of 20–30 milliliters per minute, the carbon dioxide will be retained for periods of two hours or more.

EXPERIMENTAL DATA

An investigation was undertaken to assure efficient trapping of both interfering gas species (as occurring at station 38 of the system 20 of FIG. 4) as well as carbon dioxide (as happening at station 40, FIG. 4) at dry ice temperature (−70° C.). In the experimental procedure, a glass U-tube is filled with porous, polymeric, cross-linked granules to form the trapping bed of the invention (i.e., granules manufactured by Waters Associates Inc., Framingham, Mass. under the tradename "Porapak 'N'"). Granular size: 100–120 mesh. Glass size: ⅜ inch. Bed length: 14 inches. The U-tube plugs: glass wool at each end.

By placing the U-tube in a dewar of powdered dry ice, the granules quickly attain dry ice temperature (−70° C.). Then the U-tube (and bath) is connected to a Carle gas chromatograph, the former forming a chromatographic column. The carrier gas: 99.9999% helium having a flow rate of 145 milliliters per minute.

A gas sample consisting of a mixture of nitrogen, oxygen, methane, ethane and carbon dioxide is introduced into the gas chromatograph using a sample loop and an eight-port valve equipped to backflush the column through the detector between analyses.

Using a thermal conductivity detector, the gas mixture separates into three groups: nitrogen/oxygen, methane, and ethane/carbon dioxide. With the column at −70° C., the $N_2/O_2$ gas group elutes first followed by a methane peak, but the $CO_2/C_2H_6$ gas group does not elute being strongly held by the trapping bed. However, the trapped gases can be rapidly liberated, say within two (2) minutes, by removing the dry ice bath and replacing it with a warm (∼60° C.) water bath.

Chromatograms of FIGS. 6 and 7 illustrate these elution characteristics in detail. In FIG. 6 for example, nitrogen and oxygen are seen to elute rapidly with the U-tube held at dry ice temperature followed closely (roughly 2 minutes) by methane which tails slightly. Carbon dioxide is held up for approximately 30 minutes and elutes rapidly as a sharp peak after the column is warmed. Approximately 5 cc of $CO_2$ is held back. FIG. 7 shows the carbon dioxide being held for approximately 60 minutes and eluting as a sharp peak following warming; in the second, about 0.5 cc of $CO_2$ is held back on the U-tube for one hour.

Tests were also undertaken to determine whether freezing out carbon dioxide in the U-tube packed with "Porapak 'N'" over varying times with varying sample sizes would result in $^{13}C/^{12}C$, i.e., $\delta^{13}C$, isotope fractionation effects. The results are shown in Table I and again indicate that no significant fractionation occurred. That is to say, the measured values of $\delta^{13}C$ in Table I compare favorably with the known value for carbon dioxide ($-35.14\pm0.10°/_{oo}$). Note in this regard that the averaged $\delta^{13}C$ experimental value from the known value, varies only slightly.

TABLE I

| | Amount (ml) | Time Held (minutes) | $\delta^{13}C$ (°/$_{oo}$) |
|---|---|---|---|
| Run 1 | 5.0 | 30 | $-35.23 \pm 0.07°/_{oo}$ |
| Run 2 | 5.0 | 30 | $-35.21 \pm 0.06°/_{oo}$ |
| Run 3 | 5.0 | 45 | $-35.08 \pm 0.09°/_{oo}$ |
| Run 4 | 5.0 | 10 | $-34.98 \pm 0.11°/_{oo}$ |
| Run 5 | 0.5 | 60 | $-35.22 \pm 0.07°/_{oo}$ |
| Run 6 | 0.5 | 60 | $-35.16 \pm 0.05°/_{oo}$ |
| Run 7 | 0.5 | 60 | $-35.16 \pm 1.00°/_{oo}$ |
| | | Average: | $-35.15 \pm 0.08°/_{oo}$ |

An investigation on the separation of methane from other soluble marine gases and its successful combustion to carbon dioxide and entrapment in a dry ice trap, was also undertaken using the hereinbefore-described equipment. In the tests, known sample gas mixtures are used. Methane content: approximately 33% of the mixture; the other two gases (ethane and carbon dioxide) are about equally distributed in the remainder.

Initial results show that the methane can be separated by cryogenic trapping at dry ice temperature from other soluble marine gases, viz., ethane and carbon dioxide. Secondary results indicate that the separated methane can also be combusted to carbon dioxide without sufficient fractionation occurring, followed by efficient cryogenic trapping of the latter at dry ice temperature ($-70°$ C.).

Table II indicates that no significant fractionation took place during the experiment. That is to say, a comparison of the average experimentally determined $\delta^{13}C$ (PDB)°/$_{oo}$ values in which cryogenic trapping and combustion of the methane occurred, with the known values for methane ($-35.10\pm0.10°/_{oo}$), is within experimental uncertainty limits.

TABLE II

| Sample Run | $\delta^{13}C$ (°/$_{oo}$) |
|---|---|
| Run 1 | $-30.06 \pm 0.10°/_{oo}$ |
| Run 2 | $-29.96 \pm 0.10°/_{oo}$ |
| Run 3 | $-29.99 \pm 1.00°/_{oo}$ |
| Average: | $-30.00 \pm 0.10°/_{oo}$ |

Finally, the above-described mixture of methane, ethane and carbon dioxide was injected into the system 20 of FIG. 4 having dry ice traps as used at stations 38 and 40. Two different volumetric mixtures were used. The methane content was approximately 33%, the remaining two gases, viz., ethane and carbon dioxide, made up the remainder of the mixture in about equal proportions. Final resulting $\delta^{13}C°/_{oo}$ values are tabulated in Table III.

TABLE III

| Volume $CH_4$ Used (in cc) | $\delta^{13}C$ (°/$_{oo}$) |
|---|---|
| 0.15 | $-31.60 \pm 0.10°/_{oo}$ |
| 0.80 | $-31.40 \pm 0.10°/_{oo}$ |
| 0.80 | $-32.30 \pm 0.10°/_{oo}$ |
| 0.80 | $-32.00 \pm 0.10°/_{oo}$ |
| Average: | $-31.80 \pm 0.10°/_{oo}$ |

Table III indicates that the resulting $\delta^{13}C°/_{oo}$ values are within experimental uncertainty limits irrespective of the volume of methane used. Also, the average determined $\delta^{13}C°/_{oo}$ (PDB) value, viz., $-31.80\pm0.10°/_{oo}$, favorably compares with the known $\delta^{13}C°/_{oo}$ value for methane, viz., $-30.10\pm0.10°/_{oo}$), being lighter by only $-1.7°/_{oo}$, an amount well within experimental limits.

From the above, it is apparent from the invention as hereinbefore described that variations are readily apparent to those skilled in the art, and hence the invention is not limited to combinations hereinbefore described but should be given the broadest possible interpretation in terms of the following claims.

What is claimed is:

1. Method of on-site collection and examination of microliter concentrations of methane in sea water so as to predict hydrocarbon potential of an earth formation, said formation containing a hydrocarbon pool that is the source of said methane, said method comprising:
   (i) at known geographic locations, continuously sampling said sea water at a selected depth;
   (ii) continuously vacuum separating said collected sea water into liquid and gas phases;
   (iii) continuously monitoring said gas phase of said sea water for hydrocarbons;
   (iv) quantitatively separating methane in said gas phase of step (iii) from interfering gas species also in said gas phase of step (iii) in the presence of an air carrier vented to the atmosphere and flowing at a known flow rate;
   (v) quantitatively oxidizing said methane of step (iv) to carbon dioxide and water vapor and then cryogenically trapping out the resulting carbon dioxide and water vapor in the presence of said air carrier, using a bed of granules maintained at dry ice temperature and composed of an inert, porous organic polymer cross-linked to form a lattice network of high surface area for retention of the carbon dioxide without phase change and for trapping out of the water vapor by freezing; and
   (vi) isotopically examining the carbon and deuterium distribution of said carbon dioxide and water vapor of step (v) so as to determine biogenic and/or thermogenic origin of said methane.

2. Method of claim 1 in which step (iv) includes the following substeps performed in sequence with the flow rate of the air carrier being between about 20 to 120 milliliters per minute;
   (a) removing water vapor and molecular carbon dioxide from said gas phase of said separated sea water, by passing same through a bed of absorbent materials;
   (b) oxidizing any carbon monoxide to carbon dioxide by passing said gas phase through a catalytically aided oxidation oven, maintained at mid-temperatures;

(c) removing the carbon dioxide of step (b) by passing same through another bed of absorbent material; and (d) cryogenically trapping out all low-, mid-, and high-range molecular weight hydrocarbons above $C_1$, by passing the gas phase of step (iii) through a second bed of said cross-linked, porous, polymeric granules maintained at dry ice temperature, whereby all interfering gas species in said gas phase of step (iii) are removed prior to oxidation of methane in said gas phase.

3. Method of claim 2 in which step (v) includes the substeps of:

(a) oxidizing methane contained in said gas phase to carbon dioxide and water vapor by passing said methane and said air carrier through a catalytically aided oxidation oven maintained at a selected temperature range; and (b) cryogenically trapping out said carbon dioxide and water vapor of substep (a) by passing same through said bed of granules maintained at dry ice temperature and composed of a porous polymer cross-linked to form a lattice network for retention of the carbon dioxide by adsorption, diffusion and partitioning without phase change.

4. Method of claim 3 in which said granules are a styrenedivinylbenzene polymer to provide a surface area per unit weight limitation of about 450 meters square per gram.

5. Method of claim 3 in which said cryogenic trapping temperature of step (v) is about $-70°$ C.

* * * * *